(12) United States Patent
Shapira et al.

(10) Patent No.: US 8,594,133 B2
(45) Date of Patent: Nov. 26, 2013

(54) COMMUNICATION SYSTEM USING LOW BANDWIDTH WIRES

(75) Inventors: Isaac Shapira, Petach Tikva (IL); Ofer Saban, Moshav Kidron Israel (IL); Yair Zeev Shapira, Shoham (IL)

(73) Assignee: Corning MobileAccess Ltd., Airport (IL)

( * ) Notice: Subject to any disclaimer, the term of this patent is extended or adjusted under 35 U.S.C. 154(b) by 598 days.

(21) Appl. No.: 12/739,143

(22) PCT Filed: Oct. 22, 2008

(86) PCT No.: PCT/IB2008/054347
§ 371 (c)(1),
(2), (4) Date: Apr. 22, 2010

(87) PCT Pub. No.: WO2009/053910
PCT Pub. Date: Apr. 30, 2009

(65) Prior Publication Data
US 2010/0309931 A1 Dec. 9, 2010

Related U.S. Application Data

(60) Provisional application No. 60/960,937, filed on Oct. 22, 2007.

(51) Int. Cl.
*H04J 3/06* (2006.01)
(52) U.S. Cl.
USPC ........................................ 370/503
(58) Field of Classification Search
USPC .......................... 370/350, 503–514
See application file for complete search history.

(56) References Cited

U.S. PATENT DOCUMENTS

| | | | |
|---|---|---|---|
| 2,092,709 A | 9/1937 | Wheeler | |
| 2,298,435 A | 10/1942 | Tunick | |
| 2,411,786 A | 11/1946 | Halstead | |
| 2,568,342 A | 9/1951 | Koehler et al. | |
| 2,613,285 A | 10/1952 | Fromm | |
| 2,671,850 A | 3/1954 | Marcou | |

(Continued)

FOREIGN PATENT DOCUMENTS

| | | |
|---|---|---|
| CN | 1430848 A | 7/2003 |
| DE | 20317501 U1 | 1/2004 |

(Continued)

OTHER PUBLICATIONS

European Search Report issued Apr. 6, 2011 for European Patent Application No. 10182929.9, 7 pages.

(Continued)

*Primary Examiner* — Kwang B Yao
*Assistant Examiner* — Juvena Loo
(74) *Attorney, Agent, or Firm* — C. Keith Montgomery (57) ABSTRACT

A high frequency signal is down-converted into an intermediate frequency signal, transmitted over a limited bandwidth medium from a master unit to a remote unit and up-converted back into its original high frequency at the remote unit. The up-conversion is aided by reconstruction of a reference signal embedded at the master unit as a carrier for a management signal which is transmitted to the remote unit through the same limited bandwidth medium together with the intermediate frequency signal. The reference signal is reconstructed using a phase locked loop which includes a charge pump and is kept stable during intervals between bits and messages by a charge pump shutter.

8 Claims, 4 Drawing Sheets

(56) References Cited

U.S. PATENT DOCUMENTS

| | | |
|---|---|---|
| 2,747,083 A | 5/1956 | Guanella |
| 2,964,623 A | 12/1960 | Bell |
| 2,986,723 A | 5/1961 | Darwin et al. |
| 3,072,899 A | 1/1963 | Kleist et al. |
| 3,274,339 A | 9/1966 | Herry et al. |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Haselwood et al. |
| 3,656,112 A | 4/1972 | Paull |
| 3,699,250 A | 10/1972 | Bunting |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,937,889 A | 2/1976 | Bell, III et al. |
| 3,992,589 A | 11/1976 | Kuegler |
| 4,008,369 A | 2/1977 | Theurer et al. |
| 4,013,840 A | 3/1977 | Anderson |
| 4,035,838 A | 7/1977 | Bassani et al. |
| 4,049,914 A | 9/1977 | Anderson et al. |
| 4,054,910 A | 10/1977 | Chou et al. |
| 4,063,173 A | 12/1977 | Nelson et al. |
| 4,171,467 A | 10/1979 | Evenchik |
| 4,186,347 A | 1/1980 | Frosch et al. |
| 4,199,761 A | 4/1980 | Whyte et al. |
| 4,200,862 A | 4/1980 | Campbell et al. |
| 4,205,270 A | 5/1980 | Okatani et al. |
| 4,206,320 A | 6/1980 | Keasler et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,417,279 A | 11/1983 | Shinkawa et al. |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,449,246 A | 5/1984 | Seiler et al. |
| 4,456,925 A | 6/1984 | Skerlos et al. |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,467,140 A | 8/1984 | Fathauer et al. |
| 4,468,538 A | 8/1984 | Cripps |
| 4,476,574 A | 10/1984 | Struven |
| 4,485,400 A | 11/1984 | Lemelson et al. |
| 4,493,948 A | 1/1985 | Sues et al. |
| 4,500,751 A | 2/1985 | Darland et al. |
| 4,500,976 A | 2/1985 | DuBroff |
| 4,506,387 A | 3/1985 | Walter |
| 4,509,211 A | 4/1985 | Robbins |
| 4,521,881 A | 6/1985 | Stapleford et al. |
| 4,528,422 A | 7/1985 | Cupani |
| 4,528,519 A | 7/1985 | van Driest |
| 4,546,212 A | 10/1985 | Crowder, Sr. |
| 4,556,988 A | 12/1985 | Yoshisato |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | ab der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,706,274 A | 11/1987 | Baker et al. |
| 4,709,412 A | 11/1987 | Seymour et al. |
| 4,718,108 A | 1/1988 | Davidson et al. |
| 4,731,821 A | 3/1988 | Jackson, III |
| 4,746,809 A | 5/1988 | Coleman et al. |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,777,652 A | 10/1988 | Stolarczyk |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,850,009 A | 7/1989 | Zook et al. |
| 4,856,085 A | 8/1989 | Horvat |
| 4,864,588 A | 9/1989 | Simpson et al. |
| 4,866,733 A | 9/1989 | Morishita |
| 4,866,757 A | 9/1989 | Nilssen |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,901,368 A | 2/1990 | Arnold et al. |
| 4,916,460 A | 4/1990 | Powell |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,941,200 A | 7/1990 | Leslie et al. |
| 4,941,207 A | 7/1990 | Maeda et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,959,862 A | 9/1990 | Davidov et al. |
| 4,969,136 A | 11/1990 | Chamberlin et al. |
| 4,972,505 A | 11/1990 | Isberg |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,980,665 A | 12/1990 | Schotz |
| 4,985,892 A | 1/1991 | Camarata |
| 4,989,081 A | 1/1991 | Miyagawa et al. |
| 4,996,709 A | 2/1991 | Heep et al. |
| 4,999,613 A | 3/1991 | Williamson et al. |

(56) References Cited

U.S. PATENT DOCUMENTS

| | | |
|---|---|---|
| 5,010,399 A | 4/1991 | Goodman et al. |
| 5,036,513 A | 7/1991 | Greenblatt |
| 5,045,948 A | 9/1991 | Streck et al. |
| 5,046,135 A | 9/1991 | Hatcher |
| 5,051,822 A | 9/1991 | Rhoades |
| 5,068,890 A | 11/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,109,222 A | 4/1992 | Welty et al. |
| 5,109,532 A | 4/1992 | Petrovic et al. |
| 5,115,463 A | 5/1992 | Moldavsky et al. |
| 5,142,397 A | 8/1992 | Dockery |
| 5,161,021 A | 11/1992 | Tsai |
| 5,187,803 A | 2/1993 | Sohner et al. |
| 5,187,806 A | 2/1993 | Johnson et al. |
| 5,210,788 A | 5/1993 | Nilssen |
| 5,230,086 A | 7/1993 | Saul |
| 5,247,347 A | 9/1993 | Litteral et al. |
| 5,251,053 A | 10/1993 | Heidemann |
| 5,255,268 A | 10/1993 | Cato et al. |
| 5,257,006 A | 10/1993 | Graham et al. |
| 5,265,150 A | 11/1993 | Helmkamp et al. |
| 5,283,637 A | 2/1994 | Goolcharan |
| 5,297,203 A | 3/1994 | Rose et al. |
| 5,321,736 A | 6/1994 | Beasley |
| 5,321,846 A | 6/1994 | Yokota et al. |
| 5,339,184 A | 8/1994 | Tang |
| 5,353,334 A | 10/1994 | O'Sullivan |
| 5,361,407 A | 11/1994 | Sawada et al. |
| 5,363,432 A | 11/1994 | Martin et al. |
| 5,379,005 A | 1/1995 | Aden et al. |
| 5,404,570 A | 4/1995 | Charas et al. |
| 5,408,260 A | 4/1995 | Arnon |
| 5,410,343 A | 4/1995 | Coddington et al. |
| 5,428,836 A | 6/1995 | Sanecki et al. |
| 5,432,838 A | 7/1995 | Purchase et al. |
| 5,452,289 A | 9/1995 | Sharma et al. |
| 5,457,557 A | 10/1995 | Zarem et al. |
| 5,463,616 A | 10/1995 | Kruse et al. |
| 5,469,495 A | 11/1995 | Beveridge |
| 5,481,249 A | 1/1996 | Sato |
| 5,489,894 A | 2/1996 | Murray |
| 5,502,446 A | 3/1996 | Denninger |
| 5,537,637 A | 7/1996 | Sugita et al. |
| 5,539,821 A | 7/1996 | Blonder |
| 5,548,592 A | 8/1996 | Komarek et al. |
| 5,550,836 A | 8/1996 | Albrecht et al. |
| 5,550,898 A | 8/1996 | Abbasi et al. |
| 5,551,057 A | 8/1996 | Mitra |
| 5,553,063 A | 9/1996 | Dickson |
| 5,565,855 A | 10/1996 | Knibbe |
| 5,572,575 A | 11/1996 | Yamamoto et al. |
| 5,574,964 A | 11/1996 | Hamlin |
| 5,579,221 A | 11/1996 | Mun |
| 5,587,692 A | 12/1996 | Graham et al. |
| 5,600,333 A | 2/1997 | Justice et al. |
| 5,603,080 A | 2/1997 | Kallander et al. |
| 5,610,916 A | 3/1997 | Kostreski et al. |
| 5,619,251 A | 4/1997 | Kuroiwa et al. |
| 5,619,505 A | 4/1997 | Grube et al. |
| 5,621,455 A | 4/1997 | Rogers et al. |
| 5,625,863 A | 4/1997 | Abraham |
| 5,628,055 A | 5/1997 | Stein |
| 5,634,191 A | 5/1997 | Beasley |
| 5,646,983 A | 7/1997 | Suffern et al. |
| 5,657,358 A | 8/1997 | Panech et al. |
| 5,675,375 A | 10/1997 | Riffee |
| 5,694,232 A | 12/1997 | Parsay et al. |
| 5,696,790 A | 12/1997 | Graham et al. |
| 5,696,861 A | 12/1997 | Schimmeyer et al. |
| 5,708,705 A | 1/1998 | Yamashita et al. |
| 5,708,961 A | 1/1998 | Hylton et al. |
| 5,722,076 A | 2/1998 | Sakabe et al. |
| 5,734,678 A | 3/1998 | Paneth et al. |
| 5,736,965 A | 4/1998 | Mosebrook et al. |
| 5,748,104 A | 5/1998 | Argyroudis et al. |
| 5,757,803 A | 5/1998 | Russell et al. |
| 5,758,294 A | 5/1998 | Ganesan et al. |
| 5,765,099 A * | 6/1998 | Georges et al. ................. 455/14 |
| 5,774,789 A | 6/1998 | van der Kaay et al. |
| 5,778,303 A | 7/1998 | Shinozaki et al. |
| 5,787,115 A | 7/1998 | Turnbull et al. |
| 5,802,283 A | 9/1998 | Grady et al. |
| 5,809,395 A | 9/1998 | Hamilton-Piercy et al. |
| 5,812,184 A | 9/1998 | Martinez |
| 5,812,786 A | 9/1998 | Seazholtz et al. |
| 5,815,086 A | 9/1998 | Ivie et al. |
| 5,822,678 A | 10/1998 | Evanyk |
| 5,828,663 A | 10/1998 | Ikegami |
| 5,832,364 A | 11/1998 | Gustafson |
| 5,832,365 A | 11/1998 | Chen et al. |
| 5,835,863 A | 11/1998 | Ikenouchi et al. |
| 5,838,226 A | 11/1998 | Houggy et al. |
| 5,841,360 A | 11/1998 | Binder |
| 5,841,840 A | 11/1998 | Smith et al. |
| 5,841,841 A | 11/1998 | Dodds et al. |
| 5,848,054 A | 12/1998 | Mosebrook et al. |
| 5,848,150 A | 12/1998 | Bingel |
| 5,864,284 A | 1/1999 | Sanderson |
| 5,878,047 A | 3/1999 | Ganek et al. |
| 5,896,443 A | 4/1999 | Dichter |
| 5,896,569 A | 4/1999 | Butler et al. |
| 5,901,340 A | 5/1999 | Flickinger et al. |
| 5,905,442 A | 5/1999 | Mosebrook et al. |
| 5,910,776 A | 6/1999 | Black |
| 5,912,895 A | 6/1999 | Terry et al. |
| 5,926,531 A | 7/1999 | Petite |
| 5,929,896 A | 7/1999 | Goodman et al. |
| 5,930,340 A | 7/1999 | Bell |
| 5,930,682 A | 7/1999 | Schwartz et al. |
| 5,930,719 A | 7/1999 | Babitch et al. |
| 5,936,660 A | 8/1999 | Gurantz |
| 5,937,342 A | 8/1999 | Kline |
| 5,937,348 A | 8/1999 | Cina et al. |
| 5,940,400 A | 8/1999 | Eastmond et al. |
| 5,949,476 A | 9/1999 | Pocock et al. |
| 5,950,149 A | 9/1999 | Fieramosca et al. |
| 5,953,670 A | 9/1999 | Newson |
| 5,960,066 A | 9/1999 | Hartmann et al. |
| 5,963,539 A | 10/1999 | Webber, Jr. et al. |
| 5,963,595 A | 10/1999 | Graham et al. |
| 5,977,913 A | 11/1999 | Christ |
| 5,982,363 A | 11/1999 | Naiff |
| 5,982,784 A | 11/1999 | Bell |
| 5,982,854 A | 11/1999 | Ehreth |
| 5,983,070 A | 11/1999 | Georges et al. |
| 5,986,574 A | 11/1999 | Colton |
| 5,987,303 A | 11/1999 | Dutta et al. |
| 5,994,998 A | 11/1999 | Fisher et al. |
| 5,995,593 A | 11/1999 | Cho |
| 5,995,598 A | 11/1999 | Berstis |
| 6,002,722 A | 12/1999 | Wu |
| 6,005,873 A | 12/1999 | Amit |
| 6,005,884 A | 12/1999 | Cook et al. |
| 6,014,546 A * | 1/2000 | Georges et al. ................. 725/79 |
| 6,026,150 A | 2/2000 | Frank et al. |
| 6,032,057 A | 2/2000 | Kiiski |
| 6,038,425 A | 3/2000 | Jeffrey |
| 6,040,759 A | 3/2000 | Sanderson |
| 6,049,705 A | 4/2000 | Xue |
| 6,052,380 A | 4/2000 | Bell |
| 6,061,357 A | 5/2000 | Olshansky et al. |
| 6,061,392 A | 5/2000 | Bremer et al. |
| 6,069,588 A | 5/2000 | O'Neill, Jr. |
| 6,069,899 A | 5/2000 | Foley |
| 6,087,860 A | 7/2000 | Liu et al. |
| 6,088,368 A | 7/2000 | Rubinstain et al. |
| 6,094,441 A | 7/2000 | Jung et al. |
| 6,101,341 A | 8/2000 | Manabe |
| 6,108,331 A | 8/2000 | Thompson |
| 6,115,755 A | 9/2000 | Krishan |
| 6,128,470 A | 10/2000 | Naidu et al. |
| 6,130,893 A | 10/2000 | Whittaker et al. |

(56) References Cited

U.S. PATENT DOCUMENTS

| | | | |
|---|---|---|---|
| 6,130,896 A | 10/2000 | Lueker et al. |
| 6,137,865 A | 10/2000 | Ripy et al. |
| 6,141,356 A | 10/2000 | Gorman |
| 6,151,480 A | 11/2000 | Fischer et al. |
| 6,157,810 A | 12/2000 | Georges et al. |
| 6,175,860 B1 | 1/2001 | Gaucher |
| 6,192,399 B1 | 2/2001 | Goodman |
| 6,198,432 B1 | 3/2001 | Janky |
| 6,202,211 B1 | 3/2001 | Williams, Jr. |
| 6,212,227 B1 | 4/2001 | Ko et al. |
| 6,215,789 B1 | 4/2001 | Keenan et al. |
| 6,216,160 B1 | 4/2001 | Dichter |
| 6,218,931 B1 | 4/2001 | Asghar et al. |
| 6,240,166 B1 | 5/2001 | Collin et al. |
| 6,243,413 B1 | 6/2001 | Beukema |
| 6,243,571 B1 | 6/2001 | Bullock et al. |
| 6,249,671 B1 | 6/2001 | Tucker et al. |
| 6,256,296 B1 | 7/2001 | Ruziak et al. |
| 6,292,467 B1 | 9/2001 | Keller |
| 6,292,517 B1 | 9/2001 | Jeffress et al. |
| 6,310,894 B1 | 10/2001 | Counterman |
| 6,317,884 B1 | 11/2001 | Eames et al. |
| 6,320,900 B1 | 11/2001 | Liu |
| 6,324,268 B1 | 11/2001 | Balachandran et al. |
| 6,330,244 B1 | 12/2001 | Swartz et al. |
| 6,346,875 B1 | 2/2002 | Puckette et al. |
| 6,349,133 B1 | 2/2002 | Matthews et al. |
| 6,353,599 B1 | 3/2002 | Bi et al. |
| 6,370,149 B1 | 4/2002 | Gorman et al. |
| 6,389,125 B1 | 5/2002 | Ubowski |
| 6,392,349 B1 | 5/2002 | Crenshaw |
| 6,393,050 B1 | 5/2002 | Liu |
| 6,397,288 B1 | 5/2002 | Rye et al. |
| 6,400,815 B1 | 6/2002 | Gilboy et al. |
| 6,400,957 B1 | 6/2002 | Rodrigues et al. |
| 6,414,952 B2 | 7/2002 | Foley |
| 6,424,661 B1 | 7/2002 | Bentley |
| 6,427,237 B1 | 7/2002 | Aranguren et al. |
| 6,430,199 B1 | 8/2002 | Kerpez |
| 6,434,123 B1 | 8/2002 | Park |
| 6,438,109 B1 | 8/2002 | Karaoguz et al. |
| 6,449,318 B1 | 9/2002 | Rumbaugh |
| 6,452,910 B1 | 9/2002 | Vij et al. |
| 6,452,923 B1 | 9/2002 | Gerszberg et al. |
| 6,470,053 B1 | 10/2002 | Liu |
| 6,473,495 B1 | 10/2002 | Willer |
| 6,473,609 B1 | 10/2002 | Schwartz et al. |
| 6,480,510 B1 | 11/2002 | Binder |
| 6,483,470 B1 | 11/2002 | Hohnstein et al. |
| 6,483,902 B1 | 11/2002 | Stewart et al. |
| 6,492,897 B1 | 12/2002 | Mowery, Jr. |
| 6,493,875 B1 | 12/2002 | Eames et al. |
| 6,501,942 B1 * | 12/2002 | Weissman et al. ............... 455/14 |
| 6,513,163 B1 | 1/2003 | Silvia et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,587 B1 | 3/2003 | Kobayashi |
| 6,539,011 B1 | 3/2003 | Keenan et al. |
| 6,546,098 B1 | 4/2003 | Henderson |
| 6,549,616 B1 | 4/2003 | Binder |
| 6,556,581 B1 | 4/2003 | He et al. |
| 6,560,319 B1 | 5/2003 | Binder |
| 6,563,418 B1 | 5/2003 | Moon |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,572,384 B1 | 6/2003 | Marchevsky |
| 6,573,826 B2 | 6/2003 | Pan |
| 6,574,242 B1 | 6/2003 | Keenan et al. |
| 6,577,231 B2 | 6/2003 | Litwin, Jr. et al. |
| 6,577,631 B1 | 6/2003 | Keenan et al. |
| 6,580,710 B1 | 6/2003 | Bowen et al. |
| 6,580,728 B1 | 6/2003 | Cook et al. |
| 6,580,785 B2 | 6/2003 | Bremer et al. |
| 6,583,719 B2 | 6/2003 | Okada et al. |
| 6,587,473 B2 | 7/2003 | Terry et al. |
| 6,587,479 B1 | 7/2003 | Bianchi et al. |
| 6,587,739 B1 | 7/2003 | Abrams et al. |
| 6,603,808 B1 | 8/2003 | Anne et al. |
| 6,618,578 B1 | 9/2003 | Petite |
| 6,622,304 B1 | 9/2003 | Carhart |
| 6,650,871 B1 | 11/2003 | Cannon et al. |
| 6,653,932 B1 | 11/2003 | Beamish et al. |
| 6,654,616 B1 | 11/2003 | Pope, Jr. et al. |
| 6,668,328 B1 | 12/2003 | Bell |
| 6,678,321 B1 | 1/2004 | Graham et al. |
| 6,678,721 B1 | 1/2004 | Bell |
| 6,683,531 B2 | 1/2004 | Diamanti et al. |
| 6,690,677 B1 | 2/2004 | Binder |
| 6,693,916 B1 | 2/2004 | Chaplik et al. |
| 6,697,358 B2 | 2/2004 | Bernstein |
| 6,701,406 B1 | 3/2004 | Chang et al. |
| 6,710,721 B1 | 3/2004 | Holowick |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,725,059 B1 | 4/2004 | Bell |
| 6,731,945 B2 | 5/2004 | Do et al. |
| 6,732,315 B2 | 5/2004 | Yagil et al. |
| 6,735,217 B1 | 5/2004 | Webber, Jr. et al. |
| 6,737,984 B1 | 5/2004 | Welles, II et al. |
| 6,738,382 B1 | 5/2004 | West et al. |
| 6,738,597 B1 | 5/2004 | Jeung et al. |
| 6,738,641 B1 | 5/2004 | Elsasser |
| 6,748,080 B2 | 6/2004 | Russ et al. |
| 6,751,441 B1 | 6/2004 | Murray et al. |
| 6,754,186 B1 | 6/2004 | Bullman |
| 6,759,946 B2 | 7/2004 | Sahinoglu et al. |
| 6,760,601 B1 | 7/2004 | Suoknuuti et al. |
| 6,763,097 B1 | 7/2004 | Vitenberg |
| 6,771,164 B1 | 8/2004 | Fink |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,778,549 B1 | 8/2004 | Keller |
| 6,778,646 B1 | 8/2004 | Sun |
| 6,778,817 B1 | 8/2004 | Bullock et al. |
| 6,781,530 B2 | 8/2004 | Moore |
| 6,782,048 B2 | 8/2004 | Santhoff |
| 6,785,296 B1 | 8/2004 | Bell |
| 6,807,463 B1 | 10/2004 | Hamann et al. |
| 6,819,760 B1 | 11/2004 | Nayler |
| 6,822,946 B1 | 11/2004 | Wallace |
| 6,826,174 B1 | 11/2004 | Erekson et al. |
| 6,831,921 B2 | 12/2004 | Higgins |
| 6,831,975 B1 | 12/2004 | Easwaran et al. |
| 6,836,546 B1 | 12/2004 | Willer |
| 6,839,345 B2 | 1/2005 | Lu et al. |
| 6,842,459 B1 | 1/2005 | Binder |
| 6,844,809 B2 | 1/2005 | Manis et al. |
| 6,857,132 B1 | 2/2005 | Rakib et al. |
| 6,862,349 B1 | 3/2005 | Beveridge |
| 6,862,353 B2 | 3/2005 | Rabenko et al. |
| 6,865,193 B2 | 3/2005 | Terk |
| 6,868,072 B1 | 3/2005 | Lin et al. |
| 6,885,674 B2 | 4/2005 | Hunt et al. |
| 6,895,249 B2 | 5/2005 | Gaal |
| 6,901,439 B1 | 5/2005 | Bonasia et al. |
| 6,904,134 B2 | 6/2005 | Jeon et al. |
| 6,909,725 B1 | 6/2005 | Chow |
| 6,914,539 B2 | 7/2005 | Hoctor et al. |
| 6,922,407 B2 | 7/2005 | Wu |
| 6,925,089 B2 | 8/2005 | Chow et al. |
| 6,931,659 B1 | 8/2005 | Kinemura |
| 6,933,835 B2 | 8/2005 | Kline |
| 6,934,754 B2 | 8/2005 | West et al. |

(56) References Cited

U.S. PATENT DOCUMENTS

| | | |
|---|---|---|
| 6,937,056 B2 | 8/2005 | Binder |
| 6,941,364 B2 | 9/2005 | Kim et al. |
| 6,941,576 B2 | 9/2005 | Amit |
| 6,947,736 B2 | 9/2005 | Shaver et al. |
| 6,950,567 B2 | 9/2005 | Kline |
| 6,961,303 B1 | 11/2005 | Binder |
| 6,961,763 B1 | 11/2005 | Wang et al. |
| 6,963,559 B2 | 11/2005 | Elo |
| 6,963,936 B2 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,987,988 B2 | 1/2006 | Uchiyama |
| 6,989,733 B2 | 1/2006 | Simonsen et al. |
| 6,993,317 B2 | 1/2006 | Belsak, Jr. |
| 6,995,657 B2 | 2/2006 | Zalitzky et al. |
| 6,996,213 B1 | 2/2006 | De Jong |
| 6,996,837 B1 | 2/2006 | Miura et al. |
| 6,998,964 B2 | 2/2006 | Lomax, Jr. et al. |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,016,377 B1 | 3/2006 | Chun et al. |
| 7,023,382 B1 | 4/2006 | Akano |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,046,716 B1 | 5/2006 | Miao |
| 7,054,303 B2 | 5/2006 | Miyazaki et al. |
| 7,064,654 B2 | 6/2006 | Berkman et al. |
| 7,088,238 B2 | 8/2006 | Karaoguz et al. |
| 7,095,849 B2 | 8/2006 | Smith et al. |
| 7,099,368 B2 | 8/2006 | Santhoff et al. |
| 7,099,621 B1 | 8/2006 | Chadwick |
| 7,103,240 B2 | 9/2006 | Kline |
| 7,106,721 B1 | 9/2006 | Binder |
| 7,113,134 B1 | 9/2006 | Berkman |
| 7,113,574 B1 | 9/2006 | Haas et al. |
| 7,113,763 B2 | 9/2006 | Heinonen et al. |
| 7,117,520 B2 | 10/2006 | Stewart |
| 7,123,939 B1 | 10/2006 | Bird et al. |
| 7,133,729 B1 | 11/2006 | Wang et al. |
| 7,142,560 B2 | 11/2006 | Mansfield |
| 7,142,563 B1 | 11/2006 | Lin |
| 7,149,474 B1 | 12/2006 | Mikhak |
| 7,151,575 B1 | 12/2006 | Landry et al. |
| 7,154,996 B2 | 12/2006 | Strauss |
| 7,155,214 B2 | 12/2006 | Struthers et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,181,023 B1 | 2/2007 | Andrews et al. |
| 7,194,251 B2 | 3/2007 | Rubinstein et al. |
| 7,209,719 B2 | 4/2007 | Liebenow |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,266,344 B2 | 9/2007 | Rodriguez |
| 7,292,859 B2 | 11/2007 | Park |
| 7,299,287 B1 | 11/2007 | Rubinstein et al. |
| 7,317,793 B2 | 1/2008 | Binder et al. |
| 7,321,316 B2 | 1/2008 | Hancock et al. |
| 7,359,449 B2 | 4/2008 | Feher |
| 7,508,785 B2 | 3/2009 | Dale et al. |
| 7,813,451 B2 | 10/2010 | Binder et al. |
| 2001/0040472 A1* | 11/2001 | Suga et al. .............. 327/156 |
| 2002/0003873 A1 | 1/2002 | Rabenko et al. |
| 2002/0006137 A1 | 1/2002 | Rabenko et al. |
| 2002/0011923 A1 | 1/2002 | Cunningham et al. |
| 2002/0019966 A1 | 2/2002 | Yagil et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0039388 A1 | 4/2002 | Smart et al. |
| 2002/0049036 A1 | 4/2002 | Bullock et al. |
| 2002/0060617 A1 | 5/2002 | Walbeck et al. |
| 2002/0061012 A1 | 5/2002 | Thi et al. |
| 2002/0061763 A1* | 5/2002 | Weissman ............... 455/522 |
| 2002/0075806 A1 | 6/2002 | Shalvi et al. |
| 2002/0128009 A1 | 9/2002 | Boch et al. |
| 2002/0128043 A1* | 9/2002 | Chandler ................. 455/561 |
| 2002/0144159 A1 | 10/2002 | Wu et al. |
| 2002/0146207 A1 | 10/2002 | Chu |
| 2002/0166124 A1 | 11/2002 | Gurantz et al. |
| 2002/0176567 A1 | 11/2002 | Chen et al. |
| 2002/0186836 A1 | 12/2002 | Leuca et al. |
| 2002/0194383 A1 | 12/2002 | Cohen et al. |
| 2002/0198952 A1 | 12/2002 | Bell |
| 2003/0006881 A1 | 1/2003 | Reyes |
| 2003/0012158 A1 | 1/2003 | Jin et al. |
| 2003/0016418 A1 | 1/2003 | Westbrook et al. |
| 2003/0016794 A1 | 1/2003 | Brothers |
| 2003/0018975 A1 | 1/2003 | Stone |
| 2003/0031191 A1 | 2/2003 | El Wardani et al. |
| 2003/0062990 A1 | 4/2003 | Schaeffer, Jr. et al. |
| 2003/0067910 A1 | 4/2003 | Razazian et al. |
| 2003/0068033 A1 | 4/2003 | Kiko |
| 2003/0099228 A1 | 5/2003 | Alcock |
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2003/0112965 A1 | 6/2003 | McNamara et al. |
| 2003/0139151 A1 | 7/2003 | Lifshitz et al. |
| 2003/0169752 A1 | 9/2003 | Chen et al. |
| 2003/0179868 A1 | 9/2003 | Binder |
| 2003/0224728 A1 | 12/2003 | Heinonen et al. |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0090984 A1 | 5/2004 | Saint-Hilaire et al. |
| 2004/0100930 A1 | 5/2004 | Shapira et al. |
| 2004/0102196 A1 | 5/2004 | Weckstrom et al. |
| 2004/0107299 A1 | 6/2004 | Lee et al. |
| 2004/0123322 A1 | 6/2004 | Erkocevic et al. |
| 2004/0125870 A1 | 7/2004 | Yamazaki |
| 2004/0131357 A1 | 7/2004 | Farmer et al. |
| 2004/0136388 A1 | 7/2004 | Schaff |
| 2004/0151305 A1 | 8/2004 | Binder et al. |
| 2004/0158649 A1 | 8/2004 | Ophir et al. |
| 2004/0162117 A1 | 8/2004 | Liebenow |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0201457 A1 | 10/2004 | O'Toole et al. |
| 2004/0203387 A1 | 10/2004 | Grannan |
| 2004/0204040 A1 | 10/2004 | Heijnen |
| 2004/0208167 A1 | 10/2004 | Kishida |
| 2004/0208599 A1 | 10/2004 | Swartz et al. |
| 2004/0213351 A1 | 10/2004 | Shattil |
| 2004/0235468 A1 | 11/2004 | Luebke et al. |
| 2004/0248531 A1 | 12/2004 | Takaki |
| 2004/0255332 A1 | 12/2004 | Bertonis et al. |
| 2004/0259538 A1 | 12/2004 | Agbegnenou |
| 2004/0268160 A1 | 12/2004 | Atkinson et al. |
| 2005/0010954 A1 | 1/2005 | Binder |
| 2005/0018648 A1 | 1/2005 | Scheelke |
| 2005/0018857 A1 | 1/2005 | McCarty et al. |
| 2005/0024945 A1 | 2/2005 | Forbes |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |

(56) References Cited

U.S. PATENT DOCUMENTS

| | | |
|---|---|---|
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0117545 A1 | 6/2005 | Wittwer et al. |
| 2005/0136972 A1 | 6/2005 | Smith et al. |
| 2005/0144647 A1 | 6/2005 | Zussman et al. |
| 2005/0152337 A1 | 7/2005 | Wurtzel et al. |
| 2005/0164666 A1 | 7/2005 | Lang et al. |
| 2005/0180561 A1 | 8/2005 | Hazani et al. |
| 2005/0181839 A1 | 8/2005 | Tiainen et al. |
| 2005/0184915 A1 | 8/2005 | Nagel et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0265428 A1 | 12/2005 | McCorkle |
| 2005/0265430 A1 | 12/2005 | Ozluturk et al. |
| 2005/0268322 A1 | 12/2005 | Watson |
| 2005/0280598 A1 | 12/2005 | Webb et al. |
| 2006/0007945 A1 | 1/2006 | Schoettle et al. |
| 2006/0018328 A1 | 1/2006 | Mody et al. |
| 2006/0056283 A1 | 3/2006 | Anikhindi et al. |
| 2006/0066455 A1 | 3/2006 | Hancock et al. |
| 2006/0072684 A1 | 4/2006 | Feher |
| 2006/0126617 A1 | 6/2006 | Cregg et al. |
| 2006/0128425 A1 | 6/2006 | Rooyen |
| 2006/0133465 A1 | 6/2006 | Dockemeyer et al. |
| 2006/0152344 A1 | 7/2006 | Mowery, Jr. |
| 2006/0153169 A1 | 7/2006 | Koifman et al. |
| 2006/0172781 A1 | 8/2006 | Mohebbi |
| 2006/0193310 A1 | 8/2006 | Landry et al. |
| 2006/0193313 A1 | 8/2006 | Landry et al. |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0262014 A1 | 11/2006 | Shemesh et al. |
| 2006/0274745 A1 | 12/2006 | Wang et al. |
| 2006/0276227 A1 | 12/2006 | Dravida |
| 2006/0280197 A1 | 12/2006 | Stone |
| 2006/0286958 A1 | 12/2006 | Lee et al. |
| 2006/0291493 A1 | 12/2006 | Schley-May et al. |
| 2007/0002772 A1 | 1/2007 | Berkman et al. |
| 2007/0002876 A1 | 1/2007 | Berkman et al. |
| 2007/0019959 A1 | 1/2007 | Retnasothie et al. |
| 2007/0025368 A1 | 2/2007 | Ha et al. |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0254714 A1 | 11/2007 | Martich et al. |
| 2007/0264009 A1 | 11/2007 | Sabat, Jr. et al. |
| 2007/0268846 A1 | 11/2007 | Proctor et al. |
| 2007/0268886 A1 | 11/2007 | Caspi et al. |
| 2008/0144493 A1 | 6/2008 | Yeh |
| 2008/0280569 A1 | 11/2008 | Hazani et al. |

FOREIGN PATENT DOCUMENTS

| | | |
|---|---|---|
| EP | 0342858 A2 | 11/1989 |
| EP | 0355328 A2 | 2/1990 |
| EP | 0709974 A1 | 5/1996 |
| EP | 0938204 A1 | 8/1999 |
| EP | 1085684 A2 | 3/2001 |
| EP | 1331762 A1 | 7/2003 |
| EP | 1749399 A1 | 2/2007 |
| GB | 2266028 A | 10/1993 |
| GB | 2313020 A | 11/1997 |
| JP | 5252559 A | 9/1993 |
| JP | 5327569 A | 12/1993 |
| JP | 5327576 A | 12/1993 |
| WO | 9413067 A1 | 6/1994 |
| WO | 9613102 A1 | 5/1996 |
| WO | 9804054 A1 | 1/1998 |
| WO | 0180543 A2 | 10/2001 |
| WO | 0225920 A1 | 3/2002 |
| WO | 02065229 A2 | 8/2002 |
| WO | 02091618 A1 | 11/2002 |
| WO | 2004068827 A1 | 8/2004 |
| WO | 2004107783 A1 | 12/2004 |
| WO | 2005022692 A2 | 3/2005 |
| WO | 2005109845 A1 | 11/2005 |
| WO | 2006052216 A1 | 5/2006 |
| WO | 2006105185 A2 | 10/2006 |
| WO | 2006136811 A1 | 12/2006 |
| WO | 2007069241 A2 | 6/2007 |
| WO | 2007133630 A2 | 11/2007 |
| WO | 2009053910 A2 | 4/2009 |

OTHER PUBLICATIONS

European Search Report issued Apr. 5, 2011 for European Patent Application No. 10182930.7, 6 pages.
Agere Systems, "WaveLAN™ WL60040 Multimode Wireless LAN Media Access Controller (MAC)", Aug. 2003, pp. 1-10.
Agere Systems, Inc. "WaveLAN™ 802.11a/b/g Chip Set", document from Agere Systems, Feb. 2003, PA, USA, pp. 1-6.
Agere Systems, Inc. "WaveLAN™ WL54040 Dual-Band Wireless LAN Transciever", Sep. 2003, 99, pp. 1-4.
Allen Telecom Group, Inc., ActiveLite.TM. Antenna, Publication SD-1107, Dec. 1994, 6 pages.
Allen Telecom Group, Inc., MicroFill.RTM, "Systems Engineering Design Guide," Publication SD-1131, Jan. 1995, 12 pages.
Allen Telecom Group, Inc., MicroFill.RTM, "When You Have Customers in High Places," Publication SD-1106, Dec. 1994, 5 pages.
Allen Telecom Group, Inc., "The Secret to MicroLite.RTM's Coverage Success," Publication SD-1115, Jan. 1994, 3 pages.
Avery, John, "Standard Serves In-Building Microcellular PCS," Microwaves & RF, May 1995, pp. 8-12 and 40.
CAL Context Description; Revision SP3485, Rev. Feb. 2, 1996, EIA 600.82, pp. 007651-007667, 17 pages.
Common Application Language (CAL) Specification; Revision SP3484, Rev. Sep. 17, 1996, 007525-007650, EIA 600-81, 77 pages.
Goldberg, Lee, "Broadband to the Home: Challenges on the Last Mile," Electronic Design, Oct. 2, 1995, pp. 67-82.
Goldberg, Lee, "Brains and Bandwidth: Fiber Service at Copper Prices," Electronic Design, Oct. 2, 1995, pp. 51-60.
International Search Report for PCT/US2009/048155 dated Aug. 20, 2009, 10 pages.
Sanchez, et al. "A High-Performance Versatile Residential Gateway", Wireless Communications and Networking Conference, 2000, pp. 560-566.
Agere Systems, Inc. "802.11g Wireless Chip Set Technology White Paper", Mar. 2003, Agere Systems, Inc., pp. 1-12.
Dastangoo, et al., "Wireless LAN Technologies and Applications," MILCOM '93 Conference Record, IEEE, vol. 2, 1993, pp. 497-501.
Unknown, "EIA 600.41, Description of the Data Link Layer," Revision IS-60, Jan. 31, 1996, 60 pages.
Unknown, "Draft IS-60.04 Node Communications Protocol Part 6: Application Layer Specification," Revision Apr. 18, 1996, 129 pages.
Unknown, "EIA 600.10 Introduction to the CEBUS Standard," Revision Feb. 5, 1995, 19 pages.
Unknown, "Ethernet Wireless LAN Systems," BYTE Magazine, Feb. 1996, pp. 1, 5, 203.
Evans, G., "CEBus Standard User's Guide: A Complete Technical Overview," May 1996, 316 pages.
Dettmer, "GSM Over Ethernet," IEE Review, Mar. 2002, pp. 37-40.

(56) References Cited

OTHER PUBLICATIONS

Hachman, M., "Compaq to Ride the CEBus," EBN, Jan. 22, 1996, 1 page.
Trowbridge, D., "High Cost of Wiring Sparks Wireless LAN Alternatives," Computer Technology Review, vol. XIV, No. 3, Mar. 1994, 8 pages.
Hoffman, J., "Cable,Television and the Consumer Electronic Bus," Jun. 11, 1987, pp. 165-173.
Strassberg, D., "Home Automation Buses: Protocols Really Hit Home," END, Apr. 13, 1995, 9 pages.
Intel, "54 Mbps IEEE 802.11 Wireless LAN at 2.4 GHz", Nov. 2002, Intel Corp., pp. 1-8.
Unknown, "JVC Introduces Ethernet Compatible Wireless LAN System," Business Wire, Sep. 26, 1995, 1 page.
Unknown, "JVC Introduces First Ethernet Compatible Wireless LAN System," Business Wire, Nov. 7, 1995, 1 page.
JVC Introducing VIPSLAN-10, Sep. 1995, 2 pages.
JVC, "JVC Node," JVC Web Site, Accessed Jan. 18, 2007, 2 pages.
JVC, "JVC PC Card & Mobile," JVC Web Site, Accessed Jan. 18, 2007, 2 pages.
JVC, "JVC Power Hub," JVC Web Site, Accessed Jan. 18, 2007, 1 page.
JVC, "JVC Satellite," JVC Web Site, Accessed Jan. 18, 2007, 2 pages.
JVC, "JVC Station," Web Site, Accessed Jan. 18, 2007, 2 pages.
JVC, "JVC T-Adapter," JVC Web Site, Accessed Jan. 18, 2007,1 page.
JVC "VIPSLAN-10 Infrared Wireless LAN System," Sep. 1995, 10 pages.
KDI Intigrated Products, "PIN Diode switch SWX-05 from MCE", Nov. 5, 2002, KDI Integrated Products, New Jersey, United States, pp. 1-2.
Markwalter, B. E. et al., "CEBus Router Testing," IEEE Transactions on Consumer Electronics, Nov. 1991, vol. 37, No. 4, 8 pages.
Maxim Intigrated Products, "MAX9993 High Linearity 1700 MHz Down-Conversion Mixer with LO Buffer/Switch", Oct. 2002, pp. 1-12.
Maxim Intigrated Products, Maxim MAX2450 3V, Ultra-Low-Power Quadrate Modulator/Demodulator, Sep. 1998, pp. 1-8.
Unknown, "EIA 600.42 Node Medium Access Control Sublayer," Revision IS-60, Feb. 22, 1996, 54 pages.
Ophir, et al., "802.11 Over Coax—A Hybrid Coax—Wireless Home Networking Using 802.11 Technology," Texas Instruments, Jan. 2004, 6 pages.
Elmirghani, J., "Optical Wireless Systems and Networks," IEEE Communications, vol. 36, No. 12, Dec. 1998, pp. 70-71.
Pahlavan, et al., "Trends in Local Wireless Networks," Communications Magazine, IEEE, Issue 3, vol. 33, Mar. 1995, pp. 88-95.
Unknown, "EIA-600.28 Power Line/RF Symbol Encoding Sublayer," Revision May 12, 1995, Draft, 64 pages.
Powerhouse, "Wireless Remote Controls," Powerhouse Web Site, Accessed Apr. 5, 2005, 3 pages.
Powerhouse, "Wireless Wall Switches," Powerhouse Web Site, Accessed Apr. 5, 2005, 3 pages.
Unknown, "EIA-600.35, RF Physical Layer and Medium Specification," Revision: IS-600, Aug. 30, 1995, 17 pages.
Sawtek (A TriQuint company), "2441.8 MHz SAW Filter," Oct. 13, 2005, Sawtek, FL, USA, pp. 1-5.
SMSC, "SMSC—Standard Microsystems Corporation, LAN91C111 10/100 Non-PCI Ethernet Single Chip MAC+PHY", Datasheet, Revised Jun. 27, 2011, pp. 1-133.
Unknown, "EIA-600.37, Symbol Encoding Sublayer," Revision May 12, 1995, Draft, 30 pages.
Texas Instruments, "Low Power Advantage of 802.11a/g vs. 802.11b", Dec. 2003, Texas Instruments Incorporated, pp. 1-10.
TLSI Incorporated, "T83027 PLL Clock Generator IC with VCXO", Jul. 18, 2005, TLSI Incorporated, NY, USA, pp. 1-6.
Zyren, J et al. "IEEE 802.11g Offers Higher Data Rates and Longer Range", Mar. 2003, pp. 1-15.
Clegg,"VIPSLAN-10 Streaks Off the Wire," LAN Times, Dec. 18, 1995, 1 page.
JVC, "VISPLAN-10 Infrared Wireless LAN System," JVC, May 1996, 10 pages.
Zeino, et al., Functional Approach to a Hybrid Wireless Network for Mobile Stations, Personal, Indoor and Mobile Radio Communications, 5th IEEE International Symposium, Sep. 18-23, 1994, vol. 3, pp. 994-998.

\* cited by examiner

FIG. 1

Prior Art

COMMUNICATION SYSTEM USING LOW BANDWIDTH WIRES

CROSS REFERENCE TO EXISTING APPLICATIONS

Related Applications

This patent application is a National Stage of PCT/IB2008/054347 filed on Oct. 22 2008, which claims priority of U.S. Provisional Patent Application No. 60/960,937 filed Oct. 22, 2007, which is incorporated herein by reference in its entirety.

FIELD AND BACKGROUND OF THE INVENTION

The invention relates generally to communication systems using low bandwidth wires such as telephone and Ethernet lines and more particularly to accurate reconstruction of a high frequency signal which had its frequency shifted to lower frequencies in order to enable its transmission over limited bandwidth media.

Figure 1:
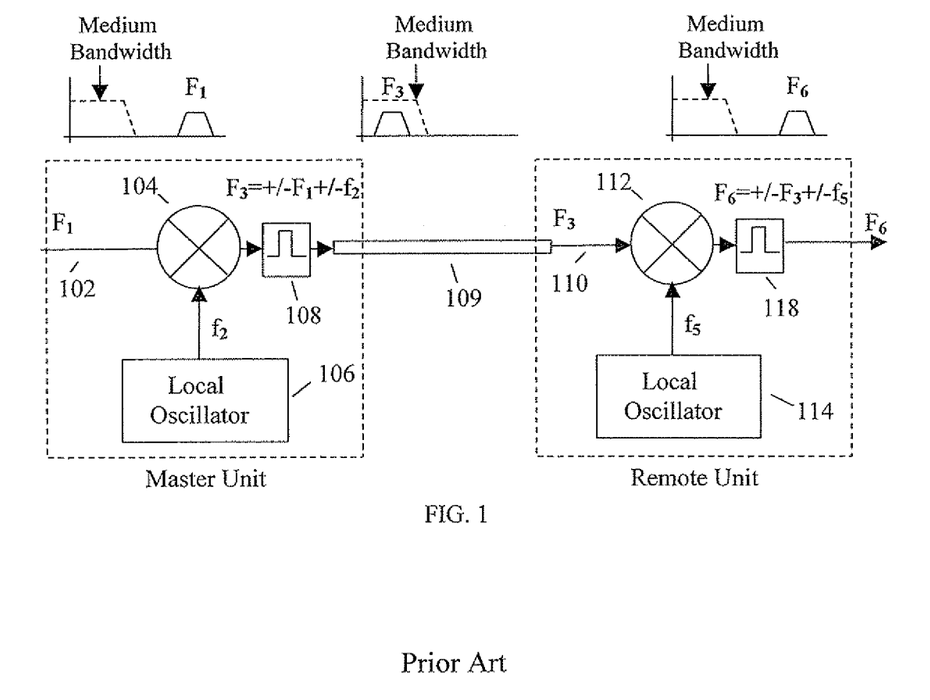
FIG. 1 describes a prior art system for transferring high frequency signals through a low bandwidth medium.

Several systems and application exist today where cellular or other high frequency signals need to be propagated through copper wires such as telephone or Ethernet lines. Since the bandwidth of copper wires is limited, high frequency signals can not propagate through them without significant attenuation. Therefore a known solution is to use a system in which the original high frequency signal is converted into a lower frequency band, which can be propagated over the copper wire and converted back to its original frequency band at the receiving side. Such a system is shown in FIG. 1. Frequency conversion is performed by mixing the incoming high frequency signal with a signal obtained by a local oscillator. The incoming high frequency signal at frequency band F1 is mixed by mixer 104 with the signal of a local oscillator 106 which its frequency is f2. The product of the mixer may be at a frequency described by F3=±F1±f2. A filter 108 at the output of the mixer 106 determines which of the possible combinations of F3 will be selected. As an example to be used in the following explanation, the required combination may be F3=f2−F1. The signal with this frequency is fed to the copper wire 109 and arrives through it to the remote unit which includes, among other elements a mixer 112, a local oscillator 114 and a band pass filter 118. The incoming signal at frequency band F3 is mixed at mixer 112 with a signal at frequency f5 produced by local oscillator 114. According to this example, filter 118 at the output of the mixer 112 selects a frequency band F6=f5−F3. In order for F6 to be an accurate replica of F1, f5 needs to be exactly the same frequency as f2. In other words, the frequency of both local oscillators needs to be the identical.

The method of transferring high frequency signals over low bandwidth media by frequency conversion is known in the art. However, this method requires the transfer of a reference signal between the master and the remote units in order to produce an accurate replica of the original signal at the remote side. U.S. Pat. No. 6,157,810 entitled "Distribution of Radio-Frequency Signals Through Low Bandwidth Infrastructure" to Georges describes such a system and proposes to transfer between the master unit and the remote unit a "reference tone" in a "IF frequency", low enough to be transferred through the wires.

This approach, as used also in other systems, requires a dedicated special frequency band in the limited bandwidth of the wires and use of a relatively sharp band pass filter in the remote unit in order to filter the reference tone out of the other signals. This becomes even more problematic when several frequency bands need to be transferred simultaneously through the wires.

SUMMARY OF THE INVENTION

In order to save bandwidth and avoid the need for a dedicated frequency band for the reference signal, this invention makes use of the management signal which is transferred between a master unit and a remote unit of a communications system for control purposes and suggests a method and a system that embed a reference signal in the discontinuous management signal transmitted between the master and the remote units. The reference signal is embedded into the management signal by using the reference signal as the carrier of management data. The use of the management channel for transfer of the reference signal removes the need for a dedicated reference channel. This saves spectrum and reduces component count and complexity. Saving spectrum has a significant importance, since the bandwidth of the copper wires is relatively low and needs to be used effectively for payload data.

The management signal is transferred through the management selected frequency band dedicated for this purpose. A phase locked loop (PLL) is used to reconstruct the reference signal in the remote units out of the management signal. Since the management signal is not continuous, there is a need for a stabilization mechanism that will hold stable the reconstructed reference signal during the intervals between bits and between messages. The stabilization mechanism includes a charge pump shutter which performs this task.

In an embodiment there is provided a method for accurate reconstruction of the reference signal transmitted between a master unit having a master local oscillator and a remote unit having a remote local oscillator, the master and remote units connected by a limited medium bandwidth, the reference signal transmitted over the limited medium bandwidth together with a signal which is down-converted from an original high frequency signal to an intermediate frequency signal at the master unit and up-converted back into the original high frequency signal at the remote unit, the method comprising the steps of at the master unit, embedding the reference signal as a carrier of a management signal and transmitting the management signal with the embedded reference signal over the limited bandwidth medium to the remote unit; at the remote unit, reconstructing the reference signal from the management signal and using the reconstructed reference signal for synchronizing the remote local oscillator with the master local oscillator.

In an embodiment there is provided a system for reconstructing a reference signal transmitted in a communications system over a limited bandwidth medium between a master unit having a master local oscillator and a remote unit having a remote local oscillator, the system comprising a modem configured to embed the reference signal at the master unit as a carrier of a management signal carrying a management data bit stream and management messages between the master unit and the remote unit and a phase locked loop for accurately reconstructing the reference signal at the remote unit, the reconstructed reference signal used to synchronize the master and remote local oscillators.

BRIEF DESCRIPTION OF THE DRAWINGS

The invention is herein described, by way of example only, with reference to the accompanying drawings, wherein.

DETAILED DESCRIPTION OF THE INVENTION

A more complete understanding of the invention, as well as further features and advantages of the invention will be apparent from the following detailed description and the accompanying drawings.

Figure 2:
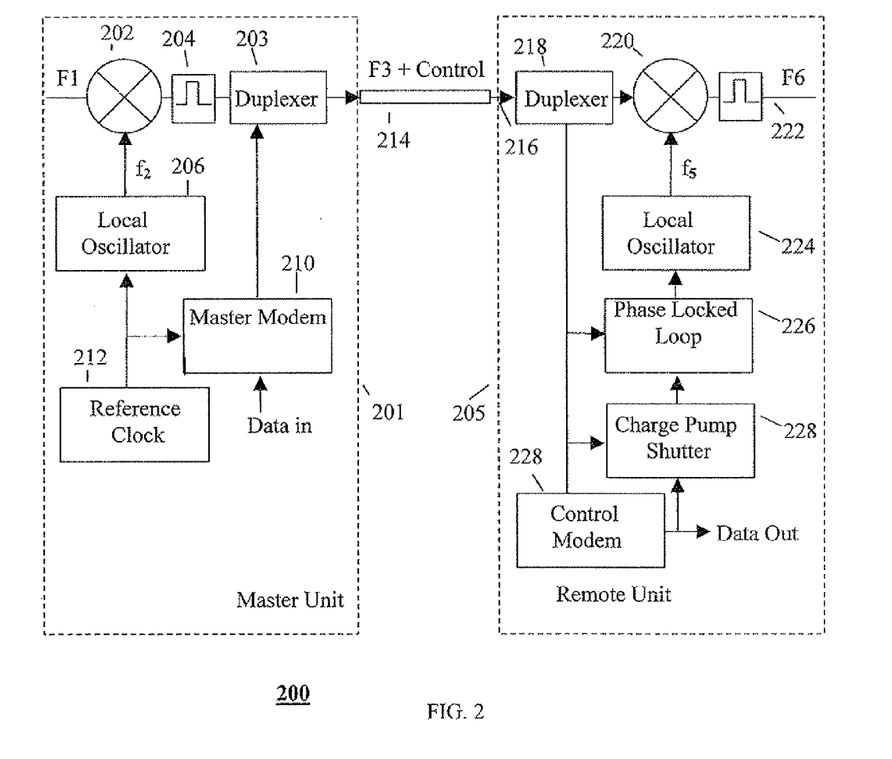
FIG. 2 shows an embodiment of a system of the invention.

FIG. 2 shows the block diagram of an embodiment of a system 200 of the invention, used to embed a reference signal into management signal. System 200 includes a master unit 201 and a remote unit 205 coupled electrically by wiring 214. Master unit 201 includes a mixer 202, a duplexer 203, a band pass filter 204, a local oscillator 206, a master modem 210 and a reference clock 212, interconnected as shown. Remote unit 205 includes an input duplexer 218, a conversion mixer 220, a band pass filter 222, a local oscillator 224, a PLL 226 and a control modem 228, interconnected as shown. PLL 226 is described in more detail with reference to FIG. 4.

Master modem 210 is used at the master side for modulating the management data over the reference signal generated by reference clock 212. That is, master modem 210 is configured and used to embed the reference signal into the management signal. The reference signal at intermediate frequency (IF) is used as a carrier for the management data. The modulated management data now becomes the management signal which is transferred through duplexer 203 and wires 214 to the remote side. At the remote side, the management signal is demodulated by control modem 228 and used for controlling the remote unit. The reference signal used by modem 210 as a carrier for the management data is derived from reference clock 212.

The reference signal is also provided to local oscillator 206, used for the conversion (down-shifting) of an original high frequency signal band F1 into an intermediate frequency band F3. The resulting mixed signal can be each of the possible positive combinations of F1 and f2 described by F3=±F1±f2. Band pass filter 204 determines which of the possible combinations is selected. Assume exemplarily that the required combination is F3=f2−F1. The converted signal in band F3 is combined with the management signal which uses the reference signal as a carrier at duplexer 203 and both are transferred through wiring 214 to the remote unit, where duplexer 218 separates the combined signal into its components according to their frequency band. The separated converted signal of band F3 is routed by duplexer 218 to conversion mixer 220. The separated management signal is routed to control modem 228 and to reference reconstruction unit 226. Control modem 228 demodulates the management signal and obtains the management data. PLL 226 is used to reconstruct the reference signal from the modulated management signal. The PLL filters out the management data and leaves a filtered reference signal. This filtered reference signal is fed to local oscillator 224. Since the reference frequency of both local oscillators 206 and 224 is derived from the same source, the frequency of the two local oscillators is made identical.

Local oscillator 224 at the remote unit produces a frequency f5 based on the reference frequency arriving from PLL 226. Mixer 220 is used for up-conversion of the signals in frequency band F3 to frequency band F6. Band pass filter 222 at the output of mixer 220 selects the frequency band F6=f5−F3. Since the frequency of the signal at the output of PLL 226 is identical to the frequency of the reference signal, both local oscillators 206 and 224 are synchronized on an identical reference frequency. As a result, the F6 band becomes an accurate replica of the F1 band. That is, each signal in the F1 band returns exactly to its original frequency in the F6 band. The same principles may be used with multiple remote units. Furthermore, the same principles may be used where F1 represents multiple frequency bands (and consequently F3 and F6 represent multiple frequency bands).

Figure 3:
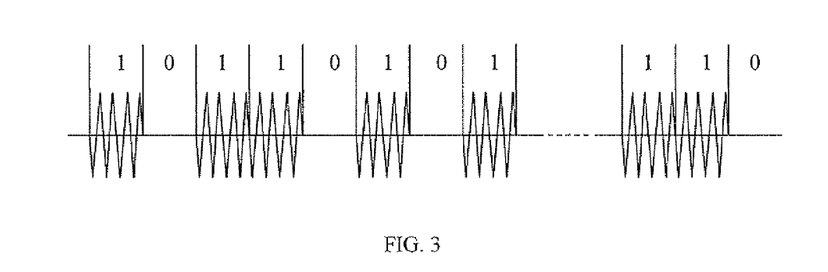
FIG. 3 shows the form of a signal modulated by On-Off Keying (OOK) modulation.

In many applications, the management data is modulated using an On-Off-Keying modulation (OOK) scheme, shown exemplarily in FIG. 3. According to this scheme, an RF signal is transmitted (ON) when a bit="1" needs to be delivered and no RF signal is transmitted (OFF) when a bit="0" needs to be delivered. The interval between RF transmissions in the same message might last up to several milliseconds. The interval between the messages might last several seconds.

Figure 4:
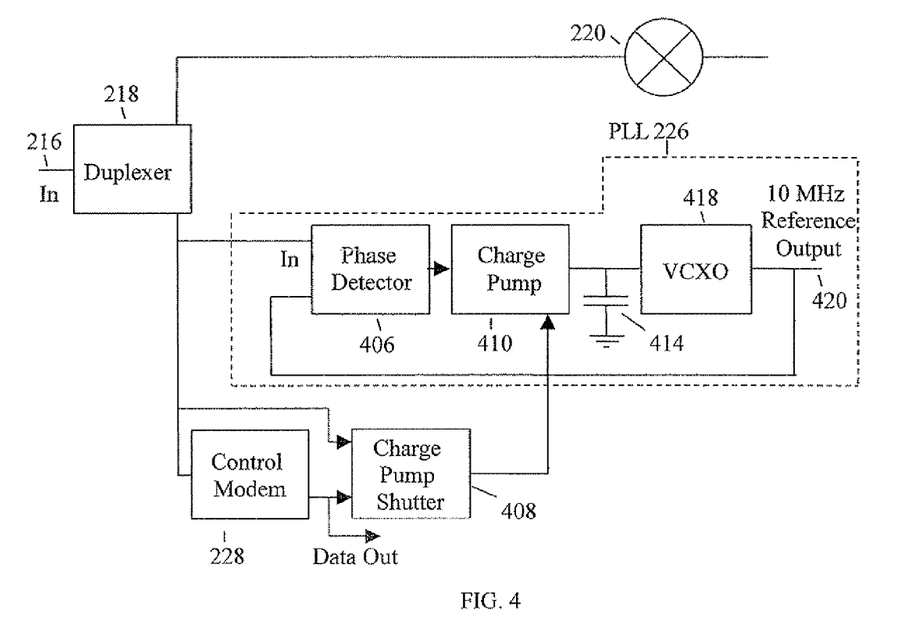
FIG. 4 describes in more details the phase locked loop in the system of FIG. 2.

FIG. 4 shows in more detail a possible implementation of the PLL 226. In this exemplary embodiment, PLL 226 includes a phase detector 406, a charge pump 410, a capacitor 414 and a highly stable voltage controlled crystal oscillator (VCXO) 41S interconnected as shown. Normally, a PLL can not deal with a non-continuous signal, such as the management signal. This problem is solved by the invention in the following way.

When the management signal transmits bit="1", an RF signal at the frequency of the reference signal appears at the input of phase detector 406. The PLL is then locked to this frequency and the VCXO is driven by the voltage on capacitor 414 controlled by charge pump 410 to generate a signal with the same frequency as the frequency of the signal at the input signal of the PLL. The lock time of the PLL is designed to be much shorter than the period of a bit. In the PLL embodiment implemented given here as an example, the period of one bit is about 50 microseconds and therefore the lock time was designed to be about 10 microseconds.

In continuous operation, the charge pump controls the frequency of the VCXO by adjusting the voltage on capacitor 414. When the voltage on the capacitor needs to be increased, charge pump 410 injects small current bursts into the capacitor (a "charge" adjustment). When the voltage on the capacitor needs to be lowered, charge pump 410 sinks small current bursts from the capacitor (a "pump" adjustment). These adjustments are required to compensate for the drift in the frequency of the VCXO. During the intervals between bits or between messages of the management signal, no reference signal appears at the input of phase detector 406 and therefore the PLL might lose its lock and the VCXO might be pulled out of the frequency of the reference signal. In order to avoid such situation, a charge pump shutter 408 is used. The charge pump shutter maintains the frequency of the \VCXO stable in the intervals between the bits and the messages. Charge pump shutter 408 senses the incoming management signal at the output of duplexer 218. When it identifies that a signal appears at the input of the phase detector 406, it allows the charge pump to change the voltage on capacitor 414. When no signal appears in the input of phase detector 406, the charge pump shutter shuts off the charge pump and therefore the voltage on capacitor 414 remains constant, thus the frequency of the VCXO 418 remains stable until the signal appears again at the input of the phase detector. The VCXO used for this PLL embodiment has non-significant drift during the interval between messages. According to the implementation described here, the maximum interval between messages is up to ten seconds where the VCXO used for this implementation drifts during this period by less then one part of ten million.

Figure 5:
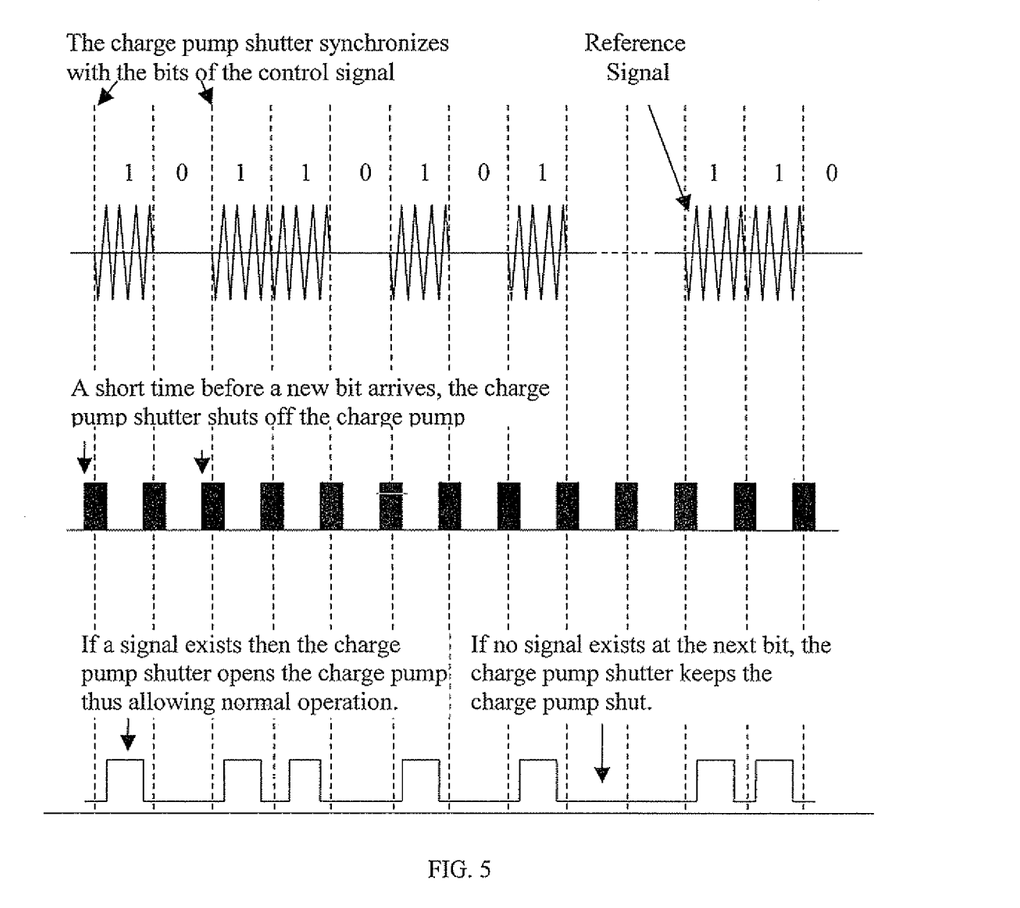
FIG. 5 describes the operation of the charge pump shutter in the phase locked loop of FIG. 4.

The charge pump shutter must shut the charge pump before the disappearance of the signal at the input of the PLL, otherwise the PLL might lose its lock and the VCXO might be pulled out of the frequency of the reference signal. Therefore, it is not possible to rely on an energy detector which responds after the disappearance of the signal and an alternative approach is proposed here. According to this approach, shown in FIG. 5, the charge pump shutter synchronizes with the data stream of the control signal which appears at the output of control modem 228. A short time before the arrival of a new bit, the charge pump shutter shuts off the charge pump and checks whether a signal exists at the next bit. If a signal exists, then the charge pump shutter opens the charge pump, thus allowing normal operation. If no signal exists at the next bit, the charge pump shutter keeps the charge pump shut. The charge pump shutter can be implemented in software, hardware or a combination of software and hardware. In software, it can be implemented using the existing microprocessor of the system and a hardware control port that shuts off the charge pump when required.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

The invention claimed is:

1. A method for accurate reconstruction of a reference signal transmitted in a communications system between a master unit having a reference clock coupled to a master local oscillator and a remote unit having a remote local oscillator, the master and remote units connected by a limited bandwidth medium, the reference signal transmitted over the limited bandwidth medium together with a signal which is down-converted from an original high frequency signal to an intermediate frequency signal at the master unit and up-converted back into the original high frequency signal at the remote unit, the method comprising:

generating the reference signal based on the reference clock;

at the master unit, embedding the reference signal as a carrier of a management signal;

transmitting the management signal with the embedded reference signal over the limited bandwidth medium to the remote unit; and at the remote unit, reconstructing the reference signal from the management signal, wherein embedding the reference signal as a carrier of a management signal comprises forming the management signal by modulating management data using an On-Off Keying modulation scheme.

2. The method of claim 1, further comprising using the reconstructed reference signal for synchronizing the remote local oscillator with the master local oscillator.

3. The method of claim 2, wherein reconstructing the reference signal from the management signal includes using a phase locked loop (PLL).

4. The method of claim 3, wherein the management signal includes a management data bit stream and wherein the step of reconstructing the reference signal from the management signal further includes using a charge pump shutter coupled to the PLL and synchronized with the management data bit stream to keep the reconstructed reference signal stable.

5. The method of claim 4, wherein the PLL includes a phased detector, a charge pump, a voltage controlled crystal oscillator and a capacitor.

6. The method of claim 4, wherein using a charge pump shutter coupled to the PLL and synchronized with the management data bit stream to keep the reconstructed reference signal stable includes using the charge pump shutter to shut off the charge pump at least during intervals between transmissions of the management signal.

7. The method of claim 5, wherein the embedded reference signal is a discontinuous signal and the PLL is adapted to filter the discontinuous reference signal.

8. The method of claim 7, wherein the charge pump controls a frequency of the voltage controlled crystal oscillator.

* * * * *